United States Patent
Ennesser et al.

(10) Patent No.: US 12,215,014 B2
(45) Date of Patent: Feb. 4, 2025

(54) FLOWABLE FOOD PRODUCT DISPENSER WITH AUTOMATED PORTION CONTROL

(71) Applicant: Server Products, Inc., Richfield, WI (US)

(72) Inventors: Steven J. Ennesser, Mequon, WI (US); Jordan Nielsen, Mayville, WI (US)

(73) Assignee: Server Products, Inc., Richfield, WI (US)

( * ) Notice: Subject to any disclaimer, the term of this patent is extended or adjusted under 35 U.S.C. 154(b) by 21 days.

(21) Appl. No.: 17/983,893

(22) Filed: Nov. 9, 2022

(65) Prior Publication Data
US 2023/0145776 A1 May 11, 2023

Related U.S. Application Data

(60) Provisional application No. 63/278,360, filed on Nov. 11, 2021.

(51) Int. Cl.
*B67D 1/10* (2006.01)
*B67D 1/08* (2006.01)

(52) U.S. Cl.
CPC .............. *B67D 1/10* (2013.01); *B67D 1/0888* (2013.01); *B67D 1/0889* (2013.01); *B67D 2210/00031* (2013.01)

(58) Field of Classification Search
CPC ...... B67D 1/10; B67D 1/0888; B67D 1/0889; B67D 2210/00031; B67D 1/0078; G01F 13/008; G01F 13/006; A47K 5/12; A47K 5/1217; B05B 11/0054; B05B 9/0861; B65D 2583/005; B05C 17/0103
See application file for complete search history.

(56) References Cited

U.S. PATENT DOCUMENTS

| | | | | |
|---|---|---|---|---|
| 5,494,193 A | * | 2/1996 | Kirschner | B67D 1/0032 222/383.2 |
| 5,735,436 A | * | 4/1998 | Schroeder | B67D 1/1286 222/383.2 |
| 6,422,421 B1 | * | 7/2002 | Freudinger | B67D 1/0005 222/530 |
| 8,490,829 B2 | * | 7/2013 | Deo | G07F 13/065 700/285 |

(Continued)

FOREIGN PATENT DOCUMENTS

| | | | | |
|---|---|---|---|---|
| WO | WO-2005094642 A1 | * | 10/2005 | ............... A23C 1/12 |
| WO | WO-2012042214 A1 | * | 4/2012 | ........... B67D 1/0007 |

*Primary Examiner* — Donnell A Long
(74) *Attorney, Agent, or Firm* — Quarles & Brady, LLP (57) ABSTRACT

A flowable food product dispenser is disclosed, The food product dispenser includes a main housing that is designed to be supported on a support surface. The main housing includes an open receiving area that includes a back support wall. An electric drive motor is included within the main housing of the food product dispenser. The main housing receives a storage container assembly that is movable into and out of the open receiving area. The storage container assembly includes a container and a pump. When the storage container assembly is moved into the open receiving area, the drive motor is able to drive the pump to withdraw the flowable food product from the container. A control unit and control panel are operable to allow a user to control the pump to selectively dispense the food product from the dispenser.

19 Claims, 9 Drawing Sheets

(56) References Cited

U.S. PATENT DOCUMENTS

| | | | | |
|---|---|---|---|---|
| 10,000,370 | B2* | 6/2018 | Bethuy | G06Q 30/0641 |
| 2006/0278657 | A1* | 12/2006 | Roatis | B67D 1/0079 |
| | | | | 222/129.1 |
| 2007/0065312 | A1* | 3/2007 | Whitehouse | B67D 1/10 |
| | | | | 417/420 |
| 2011/0108578 | A1* | 5/2011 | Wegelin | A47K 5/1217 |
| | | | | 222/372 |
| 2016/0289058 | A1* | 10/2016 | Foster | B67D 1/0029 |
| 2017/0121164 | A1* | 5/2017 | Webster | B67D 1/0894 |
| 2021/0221667 | A1* | 7/2021 | Venkatakrishnan | ............... |
| | | | | G06Q 20/209 |
| 2022/0145881 | A1 | 5/2022 | Raleigh | |

* cited by examiner

FLOWABLE FOOD PRODUCT DISPENSER WITH AUTOMATED PORTION CONTROL

CROSS REFERENCE TO RELATED APPLICATIONS

The present application is based on and claims priority to U.S. Provisional Patent Application Ser. No. 63/278,360, the disclosure of which in incorporated herein by reference.

BACKGROUND

The present disclosure generally relates to an automated food product dispenser for dispensing a flowable food product, such as a condiment or sauce, from a storage container or flexible bag. More specifically, the present disclosure relates to an automated food product dispenser that dispenses one of a plurality of user selected portion sizes in an automated manner.

Flowable food products can include a wide variety of products, such as condiments (i.e. ketchup, mustard, mayonnaise, tartar sauce, etc.) syrups, dressings, cheeses, fudge, caramel, sauces, wing sauces or other similar food products that can flow and thus be pumped. Flowable food products can include a wide variety of viscosities, non-Newtonian properties, can include small particulates and can be dispensed in a wide range of temperatures from cold to hot. Flowable food products can also be heated food products such as liquid cheese, hot ice cream toppings or chilled food products.

One of the design objectives of the present disclosure was to develop a flowable food product dispenser that will dispense a known and repeatable volume of food product based upon a selection made by the user. The food product dispenser will include a pump, drive motor and a control unit that is able to accurately control the operation of the pump to dispense the desired amount and volume of the flowable food product.

The present disclosure utilizes a pump that can be accurately driven by an electric drive motor to dispense a known and controllable volume of food product based upon the operation of the pump. A control unit receives an input from a user and operates to control the drive motor and pump to dispense the known amount of flowable food product.

SUMMARY

The present disclosure relates to a flowable food product dispenser. More specifically, the present disclosure relates to a flowable food product dispenser that includes a removable storage container assembly including a pump that engages a drive motor when installed within a main housing.

In one embodiment, a food product dispenser that is operable to selectively dispense a food product as desired by a user is disclosed. The food product dispenser includes a main housing that has an open receiving area defined by a pair of side walls and a back support wall. An electric drive motor is mounted to the back support wall and includes a drive shaft that extends into the open receiving area. The dispenser further includes a storage container assembly that is selectively movable into and out of the open receiving area of the main housing. When the storage container assembly is out of the open receiving area, a container of the assembly can be filed with the food product.

When the container is filled with the food product, the entire storage container assembly can be move into the open receiving area. In one contemplated exemplary embodiment of the present disclosure, when the storage container assembly is moved into the open receiving area, the drive motor is able to drive a pump that is associated with a container. When the container is received within the open receiving area, the drive motor can drive the pump as desired to withdraw the desired amount of food product from the open interior of the container.

In one contemplated embodiment, the pump is positioned between an inlet tube and an outlet tube of the storage container assembly. The inlet tube is in communication with the open interior of the container and the outlet tube is connected to a discharge tube of the food product dispenser.

The food product dispenser can include a control panel and a control unit that are each contained in the main housing. The control panel allows a user/operator to select the amount of food product to be dispensed. In one contemplated embodiment, the control panel could be a touch screen having a display presented to the user/operator that can be modified depending on the specific use of the food product dispenser. The control unit is operable to control the operation of the drive motor, which in turn drives the pump. In this way, the control unit can accurately control the dispensing of the food product.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
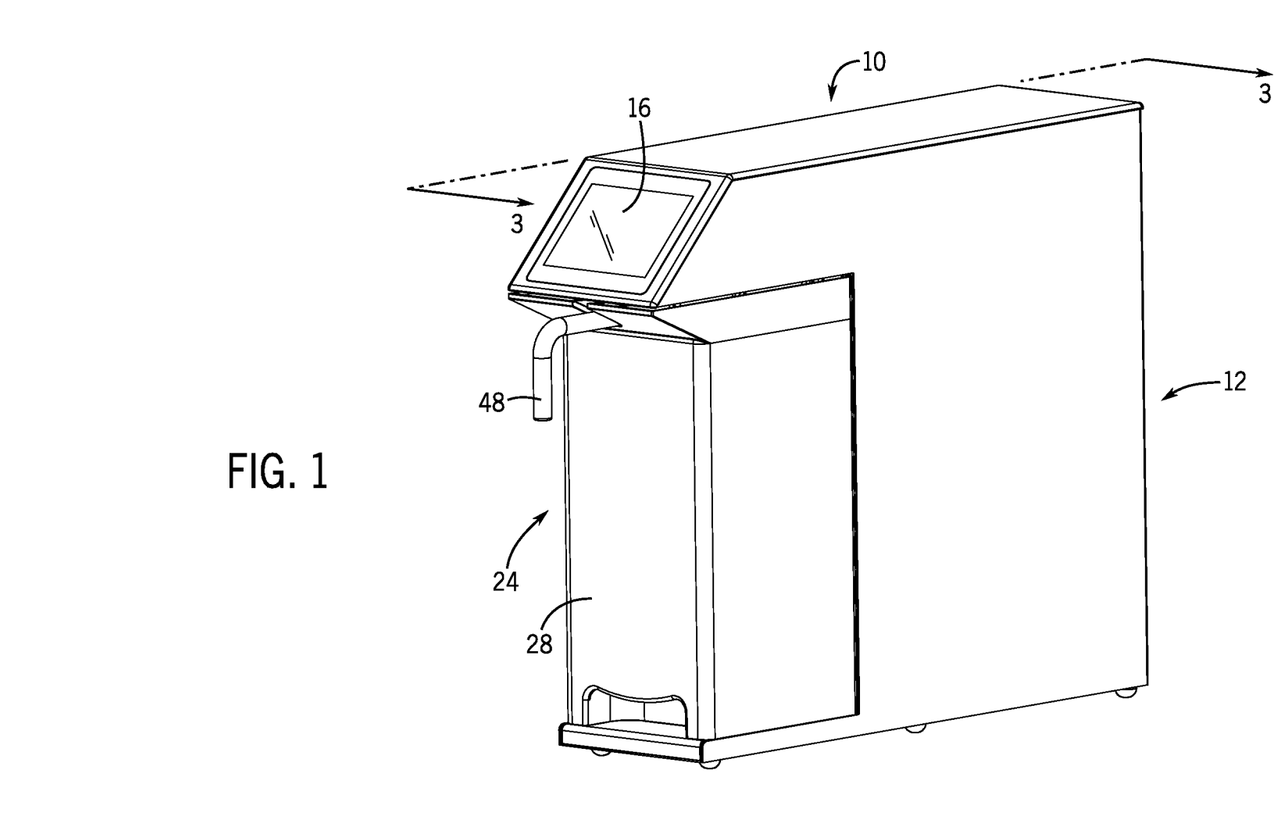
FIG. 1 is a front perspective view of a flowable food product dispenser of the present disclosure.
Figure 2:
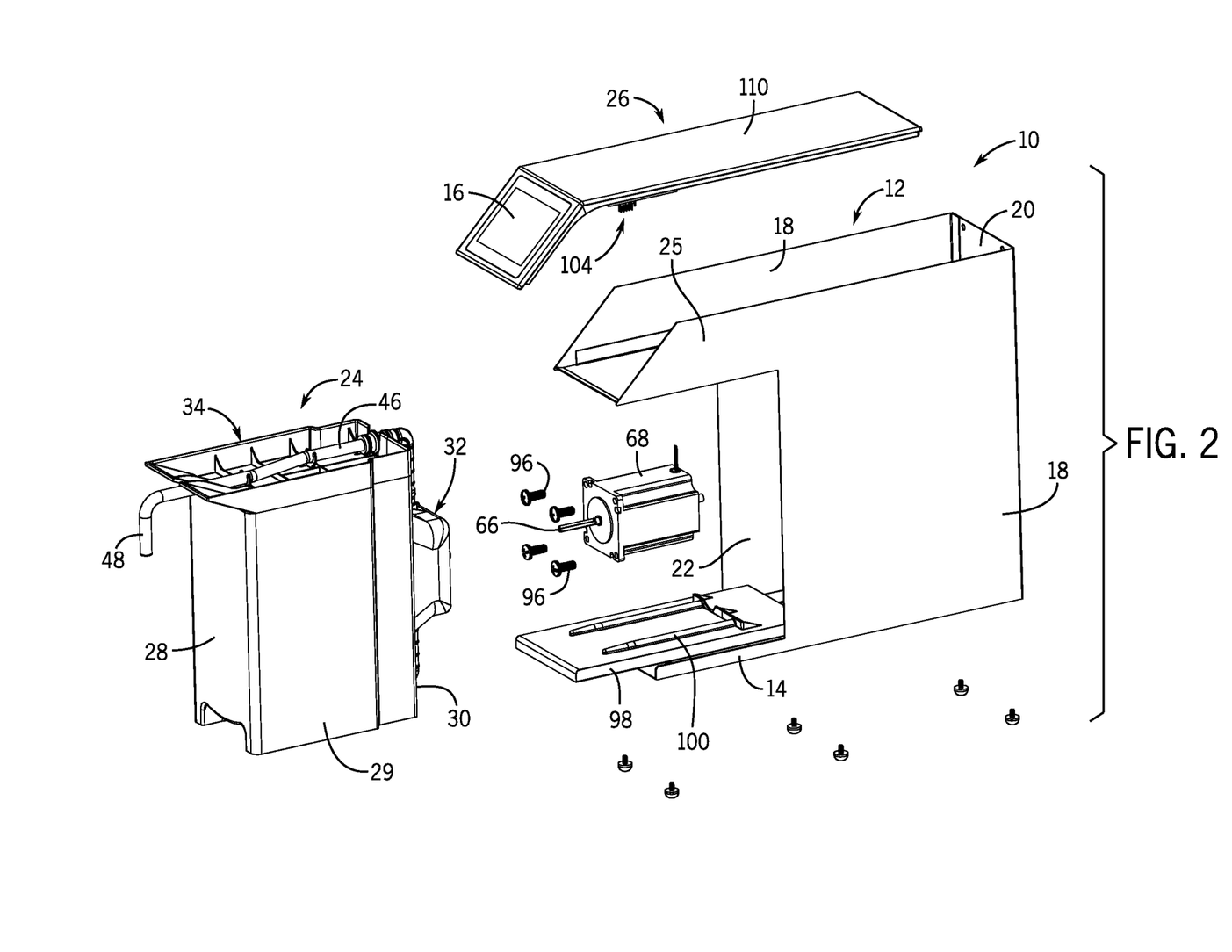
FIG. 2 is an exploded view of the flowable food product dispenser.

FIG. 1 illustrates the flowable food product dispenser constructed in accordance with one embodiment of the present disclosure. The food product dispenser 10 is designed to dispense one of a number of different types of flowable food products. As an example, the food product dispenser 10 can be used to dispense flowable food products such as condiments, syrups, dressings, cheeses, fudge, caramel sauces, wing sauces or other similar food products that can be pumped from either an open storage area or a flexible food pouch. FIG. 2 is an exploded view of the components that form the food product dispenser 10 of the present disclosure. The components shown in FIG. 2 fit together in the manner shown in FIG. 1 such that the food product dispenser 10 can be used by a restaurant or food service facility to dispense the flowable food product either onto a food product (such as traditional or boneless wings) or into a container for use with a food product.

As illustrated in FIG. 2, the food product dispenser 10 includes a main housing 12 that includes an extended base 14 designed to rest upon a support surface, such as a tabletop or counter. The main housing 12 is designed to be stationary and located in a position in the food service facility where the food products are being prepared. The main housing 12 includes a front-facing control panel 16 that is designed to provide a point of interaction between an user and the food product dispenser 10. The details of the control panel 16 will be described in much greater detail below.

The main housing 12 includes a pair of spaced side walls 18 and a back wall 20 that define a receiving area 22. The receiving area is sized to receive a portion of a removable storage container assembly 24.

As illustrated in FIGS. 1 and 2, the main housing 12 includes a top portion 25 that is designed to receive a removable top panel assembly 26. The top portion 25 extends forward from the pair of side walls 18 and provides a mounting location for the top panel assembly 26, which includes the control panel 16. The height of the storage container assembly 24 is such that the storage container assembly 24 can be received between the base 14 and the top portion 25 of the main housing 12. In the embodiment illustrated, the main housing 12 is formed from a metallic material that is both durable and can be cleaned.

Referring back to FIG. 2, the storage container assembly 24 includes an open container 28 that includes an open interior defined by a pair of side walls 29 and a rear wall 30. In the embodiment illustrated, the rear wall 30 is configured to receive and support a pump assembly 32 that is mounted to the rear wall 30 as will be described in detail below. However, it is contemplated that the pump assembly 32 could be positioned in other locations while operating within the scope of the present disclosure. The open container 28 includes a generally open interior that is sized to receive and retain a volume of the flowable food product to be dispensed. In the illustrated embodiment, the open interior is designed to receive approximately 83 ounces of a sauce that is dispensed from the food product dispenser 10. However, it is contemplated that the size of the open interior could be of a larger or smaller volume depending upon the desired use of the food product dispenser 10. In addition, it is contemplated that the open interior could receive a bag or pouch of the flowable food product instead of a direct pour embodiment in which the flowable food product is directly poured into the open interior.

The open interior of the storage container 24 is generally open and can be closed at a top end by a cover member 34. As shown in detail in FIG. 5, the cover member 34 can be formed from either plastic or metal and includes a generally flat bottom wall 36 that extends between a pair of side walls 38 and a sloped front wall 40. A back wall 42 combines with the pair of side walls 38 and the front wall 40 to define an open interior 44 of the cover member 34. A pair of cross support walls 45 extend between the side walls 38 to provide support for a dispensing tube 46. The dispensing tube 46 is supported by the cross support walls 45 and includes a dispensing spout portion 48 that extends through the front wall 40. The dispensing spout portion 48 serves as the discharge location for the food product being dispensed from the flowable food product dispenser 10. In the preferred embodiment, the dispensing tube 46 is formed from a metal material, such as stainless steel or aluminum, that is durable and can be easily cleaned.

Figure 5:
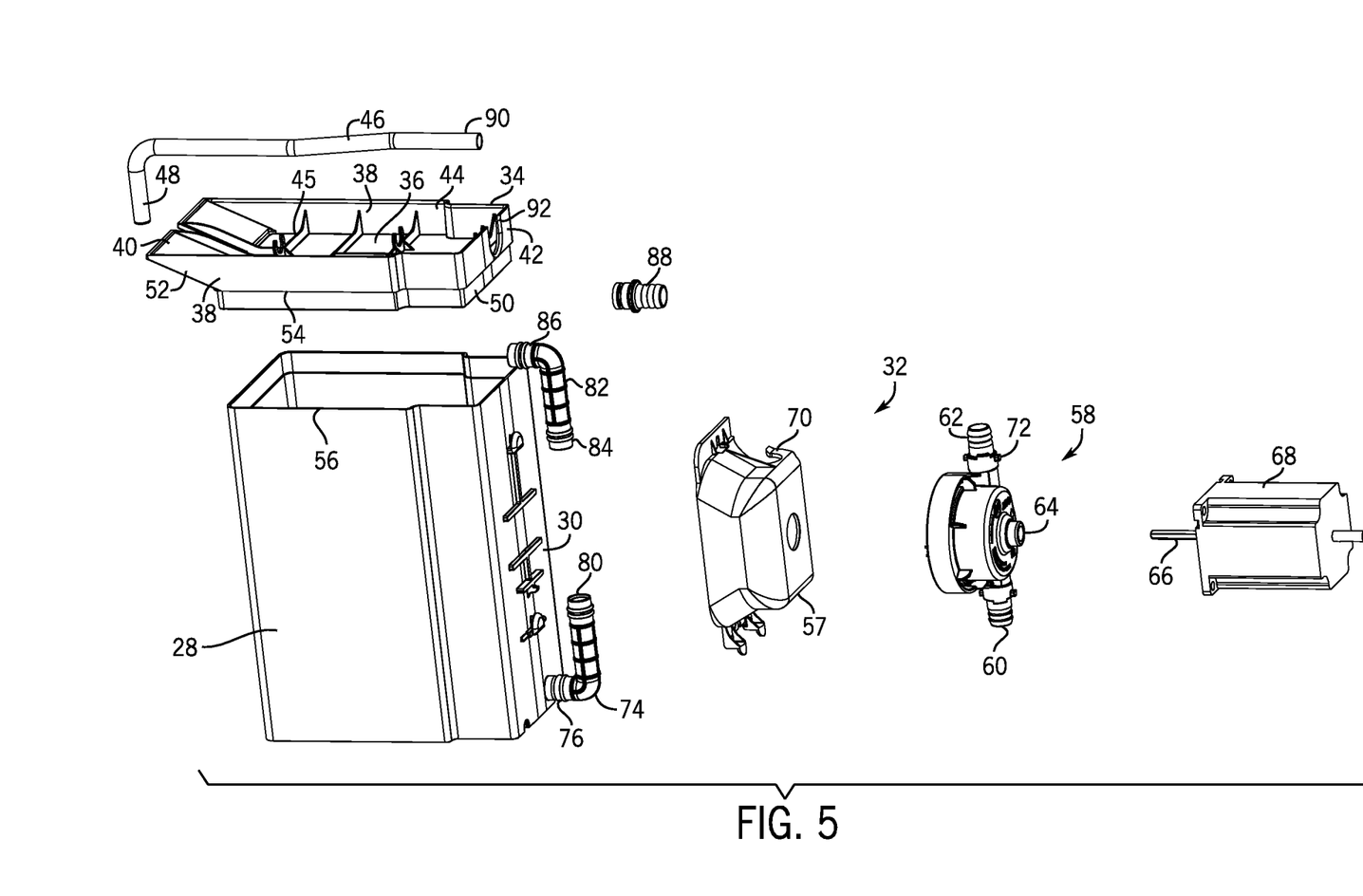
FIG. 5 is an exploded view of the storage container assembly.

As shown in FIG. 5, the cover member 34 includes a lower engagement portion 50 that is sized slightly smaller than the upper portion 52 to define a support shoulder 54. The support shoulder 54 is designed to contact the upper rim 56 of the container to support the cover member 34 on the container 28. The size of the lower engagement portion 50 and the upper rim 56 are selected to create a friction, interference fit between the cover member 34 and the container 28.

In the exemplary embodiment illustrated in FIG. 5, the pump assembly 32 includes a pump support bracket 57 and a pump 58. In the embodiment shown in FIG. 5, the pump 58 is a flexible impeller pump, such as the Server Pump™ sold by Server Products. The details of an exemplary embodiment of the pump 58 are shown in U.S. patent application Ser. No. 17/357,251, the disclosure of which is incorporated herein by reference. However, other types of pumps, such as but not limited to peristaltic pumps, could be used as long as the included pump can be accurately controlled to dispense a known volume of the flowable food product upon operation. It is contemplated that the pump 58 could be a modular component and that different types of pumps having different properties and advantages of operation could be used in accordance with the present disclosure.

The exemplary pump 58 illustrated includes an inlet 60 and an outlet 62 and is operable to pump a flowable food product from the inlet 60 to the outlet 62. The pump 58 includes a motor shaft connecting portion 64 that is specifically designed to receive a drive shaft 66 of an electric drive motor 68. When the motor drive shaft 66 is inserted into the connecting portion 64, operation of the drive motor 68 causes a flexible impeller within the pump 58 to rotate and thus pump the flowable food product through the pump 58 and out of the food product dispenser. In other embodiments, the pump 58 could be driven using other drive mechanisms other than the drive motor 68 and the drive shaft 66.

Figure 6:
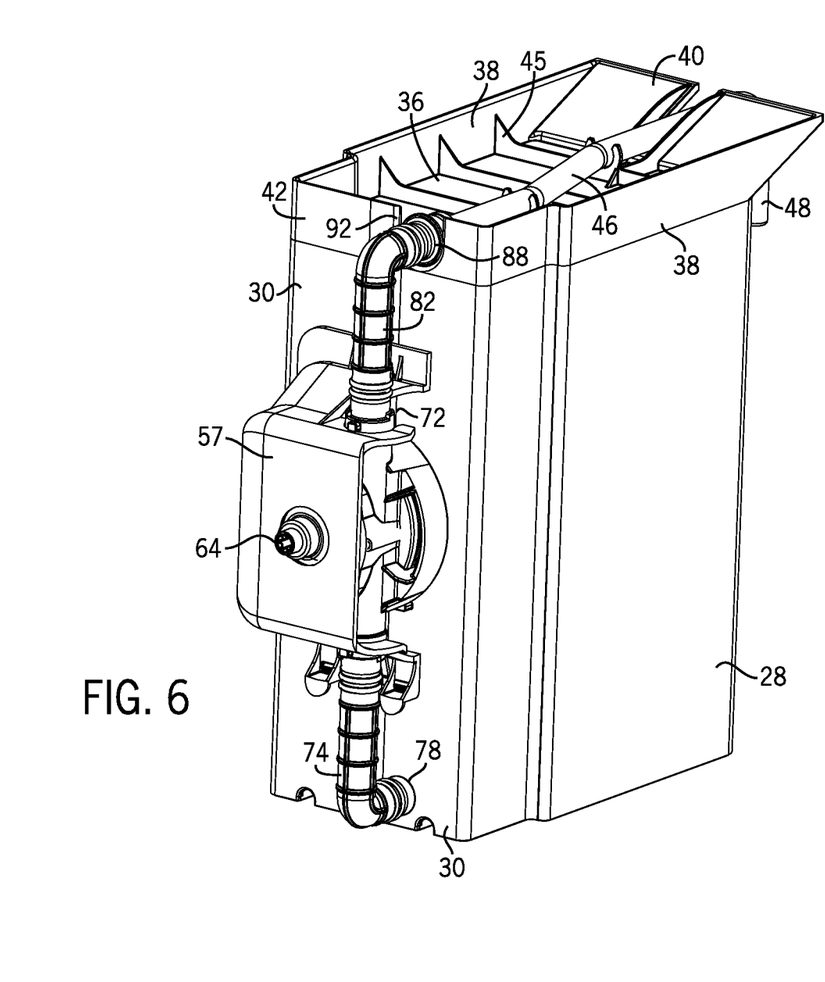
FIG. 6 is a rear view of the storage container assembly.

As shown in the rear view of FIG. 6, the pump support bracket 57 is securely mounted to the back wall 30 of the container 28. The support bracket 57 includes a pair of clip portions 70 that engage the inlet 60 and the outlet 62 of the pump 58 to hold the pump in the position shown. The inlet 60 and outlet 62 can each include a locking collar 72 to help hold the pump 58 in the mounted position. The pump 58 can be removed from the pump support bracket 57 for cleaning as needed and easily installed back in the correct position shown.

As shown in FIGS. 5 and 6, the inlet 60 of the pump 58 is connected to a pump inlet tube 74 that has a first end 76 that extends through the back wall 30 of the container 28 to access the open interior of the container 28. In this manner, the flowable food product can be drawn out of the container 28 through operation of the pump 58. As shown in FIG. 6, the outlet opening 78 formed in the back wall 30 of the container 28 is offset from the center line of the container 28 and is located near the bottom wall that defines the open interior of the container. In this manner, the flowable food product will flow toward the outlet opening 78 due the influence of gravity.

The second end 80 of the pump inlet tube 74 is designed to receive the inlet 60 of the pump 58 when the pump is supported by the pump support bracket. A pump outlet tube 82 is designed and positioned such that a first end 84 engages and receives the outlet 62 of the pump 58. The second end 86 is received within a fitting 88 that in turn is connected to an infeed end 90 of the dispensing tube 46. The fitting 88 is designed and sized to be received and retained within a cutout 92 formed in the back wall 42 of the cover member 34. The combination of the pump inlet tube 74 and the pump outlet tube 82 allows the flowable food product to be pumped from the open interior of the container 28 to the dispensing tube 46 as a result of the operation of the pump 58. In this manner, when the pump 58 operates, the pump 58 creates suction that draws the flowable food product into the pump from the storage location.

Referring back to FIG. 1, when the storage container assembly 24 is installed in the main housing 12, the spout portion 48 extends past the front wall 40 to dispense the flowable food product onto either a food product or into a container. The distance that the spout portion 48 extends downward and away from the front wall 40 can be adjusted depending on the type of food product that is being presented beneath the spout portion 48.

Figure 3:
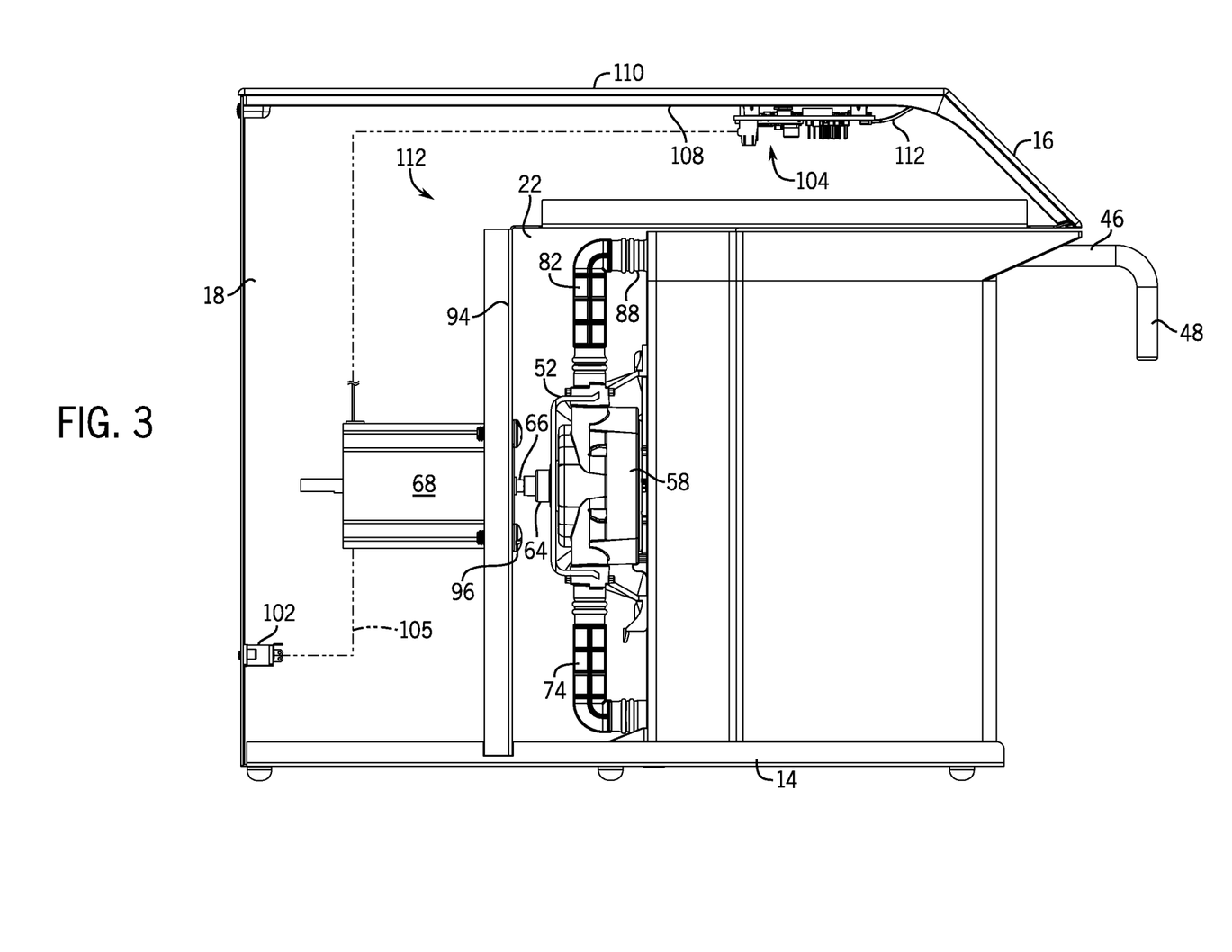
FIG. 3 is a section view of the flowable food product dispenser taken along line 3-3 of FIG. 1.
Figure 4:
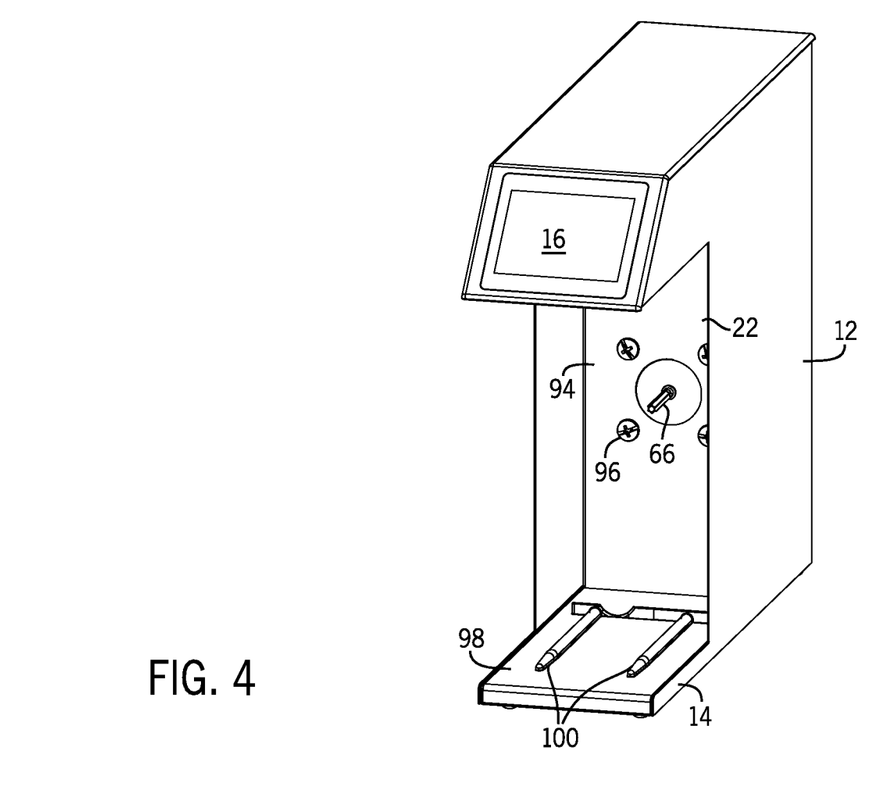
FIG. 4 is a front perspective view of the main housing with the storage container assembly removed.

FIG. 3 illustrates the mounting of the drive motor 68 within the main housing 12. As illustrated, the main housing 12 includes a support wall 94 that defines the back of the receiving area 22 sized to receive the entire storage container assembly 24. The back support wall 94 extends between the pair of spaced side walls 18 of the housing 12, one of which is removed from the image of FIG. 5. In the embodiment shown, the drive motor 68 is mounted to the back support wall 94 by a series of connectors 96. As shown in FIG. 4, when the storage container assembly is removed from the main housing 12, the drive shaft 66 extends through the support wall 94 and into the receiving area 22. In this manner, the entire drive motor 68 is conceived behind the support wall 94 and does not come into direct contact with the flowable food product during operation of the food product dispenser of the present disclosure.

As shown in FIGS. 2 and 5, the base 14 of the main housing includes a removable support panel 98. The support panel 98 is removable from the metal base 14 for cleaning. The support panel 98 includes a pair of guide rails 100 that help to guide the sliding movement of the storage container assembly 24 into and out of the receiving area 22. The guide rails 100 help to align the pump assembly on the back of the storage container assembly 24 with the drive shaft 66 extending through the support wall 94.

Figure 7:
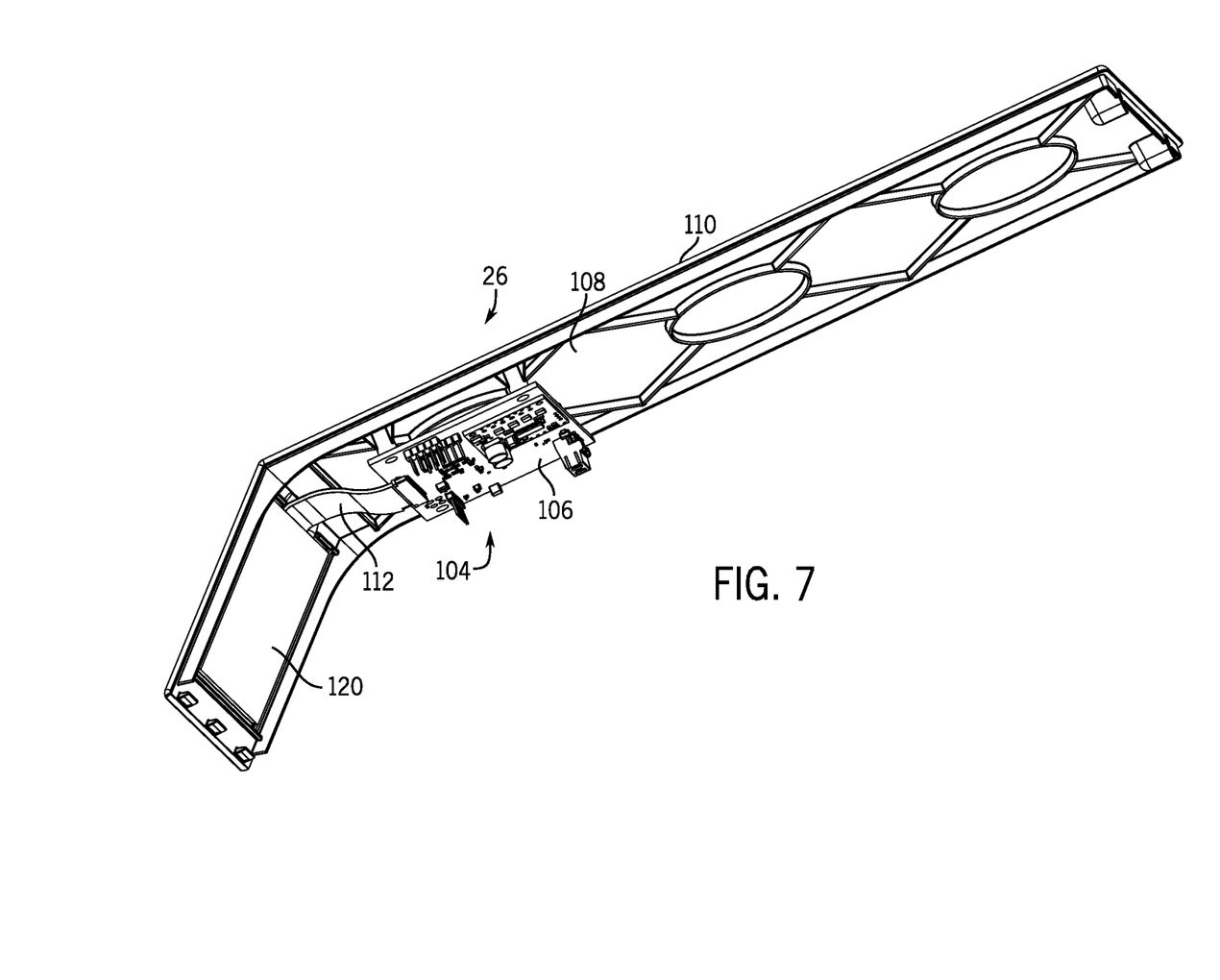
FIG. 7 is a bottom perspective view of the top panel assembly.

FIG. 3 schematically illiterates the internal components of the food product dispenser 10 that are used to control the discharge of the flowable food product. As illustrated in FIG. 3, the main housing 12 includes the drive motor 68. The drive motor 68 is preferably an electric drive motor that is connected to a power supply module 102 through a power connection line 105. The drive motor 68 will preferably include some type of encoder or other similar component that allows for the monitoring of the rotation of the drive motor 68. The power supply 102, in turn, is connected to a utility power source through a conventional plug (not shown). The power supply 102 converts the utility power source to the required voltage and current to drive the motor 68. In addition, the power supply 102 provides the required voltage and current to power a control unit 104 that is located within the main housing 12 and is part of the larger control panel assembly 26. As shown in FIG. 7, the control unit 104 includes a control board 106 and associated circuitry that is mounted to the inner surface of a top panel 110. The top panel 110 is designed to be received and mounted to the side walls of the main housing.

The control unit 104 can include various processors and control elements that allows for controlling the operation of the motor 68 and for receiving input from the control panel 16. The control panel 16 is operatively connected to the control unit 104 by the wire strip 112 such that user inputs from an operator are relayed to the control unit 104. Based on the commands from the user, the control unit 104 can control operation of the drive motor 68. In addition, the control unit 104 is able to send information and signals to the control panel 16 for display to the user.

Referring back to FIG. 3, the drive motor 68 includes the motor shaft 66 that has an engagement end that extends past the back support wall 94. The engagement end is designed to be received and interact with the engagement portion 64 of the rotating impeller of the pump 58. Specifically, the engagement end is received within the connecting portion 64 of the pump 58 shown in FIG. 3. Thus, when the storage container assembly is slid onto the base 14, the engagement end of the drive shaft of the drive motor 68 engages with the pump 58 such that the drive motor 68 can control the operation of the pump 58.

In accordance with the present disclosure, the control panel 16 can include a touch screen 120 that can includes a visual display and engagement areas as defined and dictated by the control unit 104. Since the visual display can be modified as desired, the control panel 16 can be configured for any use, portion size, dispensing amount or in any other way desired. It is contemplated that other different configurations for the user interface of the control panel could be utilized while operating within the scope of the present disclosure, such as but not limited to specific control buttons or any other type of interface.

In one contemplated configuration, the display of the control panel could include multiple selection areas that allow the operator to select between the type of food product upon which the dispensed sauce will be placed. As an example, the selection areas could include "boneless", "bone-in" and "cauliflower". It is contemplated that these selection buttons could identify a wide variety of different types of food products depending upon the desired use of the food product dispenser of the present disclosure.

In addition to the selection areas, it is contemplated that the user interface on the control panel could include multiple size engagement areas for each of the product selection areas. The volume dispensing areas allow the user to control the amount of sauce that will be dispensed onto the food product. In a contemplated embodiment, the size engagement areas could include Small, Medium and Large. Thus, if the user selects a Boneless wing option, the user can then select a small, medium or large order of boneless wings. The same holds true for the selection of Bone-In or Cauliflower. The control panel 16 could further includes a refill indicator and a reset area if desired.

In another contemplated embodiment of the user interface of the control panel, the control panel could include five different size engagement areas instead of small, medium and large. The size areas allow the user to select the number of individual food items in a food product order. As an example, if the user selects Traditional wings, the user can then select between 6, 10, 15, 20 and 30 wings within an order. The number of wings within an order will dictate the amount of sauce that is dispensed onto the food item.

In another contemplated embodiment, the control panel can include a touch area labels as "manual" or "free pour". Such area would allow a user to manually dispense the flowable food product from the food product dispenser. As an example, one press of the manual button area will prime the pump while holding the manual button will allow for a free pour until the desired amount of sauce has been dispensed.

Once again, it is contemplated that the use of the touch screen panel 120 as part of the display panel will allow for an almost unlimited number of configurations and will allow the control unit 104 to operate the pump to dispense the flowable food product in an almost unlimited number of volumes based on the user selection. Since the electric drive motor of the contemplated embodiment includes a very accurate encoder, the control unit can very accurately control the amount of food product dispensed.

Referring back to FIG. 3, when a user selects the desired selection button and size button, the control unit 104 makes a determination of the amount of time or the number of rotations the drive motor 68 needs to operate to dispense the desired amount of sauce onto the food product. For an example, a boneless wing may require less sauce than a bone-in or traditional wing. Thus, if the user selects a boneless wing order and that ten wings are within this order, the control unit will determine the amount of sauce that needs to be dispensed. The amount of sauce dispensed for a boneless wing order of ten pieces may be less than the amount of sauce needed to be dispensed onto traditional wings of a similar ten piece order. As an illustrative example, one unit of sauce is required for a boneless wing while 1.5 units of sauce are required for a traditional wings.

Once the control unit 104 determines the amount of sauce that needs to be dispensed based upon the type of food item and the size of the order of food item, the control unit 104 initiates the operation of the drive motor 68. The combination of the drive motor 68 and pump 58 are operable to dispense an accurately known volume of flowable food product for each rotation of the drive shaft 66. By counting the numbers of rotations of the drive shaft 66, the control unit 104 and motor 68 can accurately meter and control the amount of flowable food product being dispensed from the food product dispenser. In this manner, the control unit 104 is able to accurately control the amount and volume of flowable food product dispensed. In this manner, the restaurant or food service facility can accurately and repeatedly dispense the desired amount of sauce or other flowable food product onto a food item. This allows for consistency across multiple restaurant locations, which is a highly desirable feature of the present disclosure.

Figure 8:
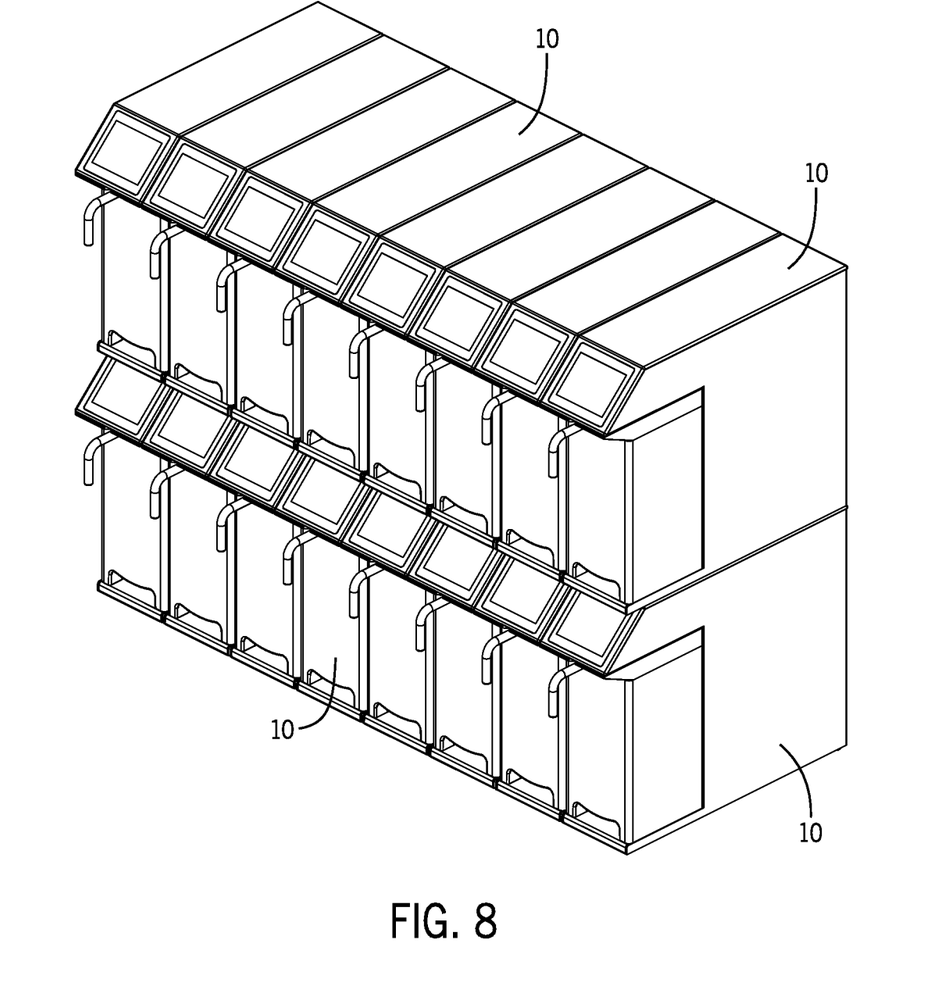
FIG. 8 is a first configuration for the arrangement of multiple food product dispensers.
Figure 9:
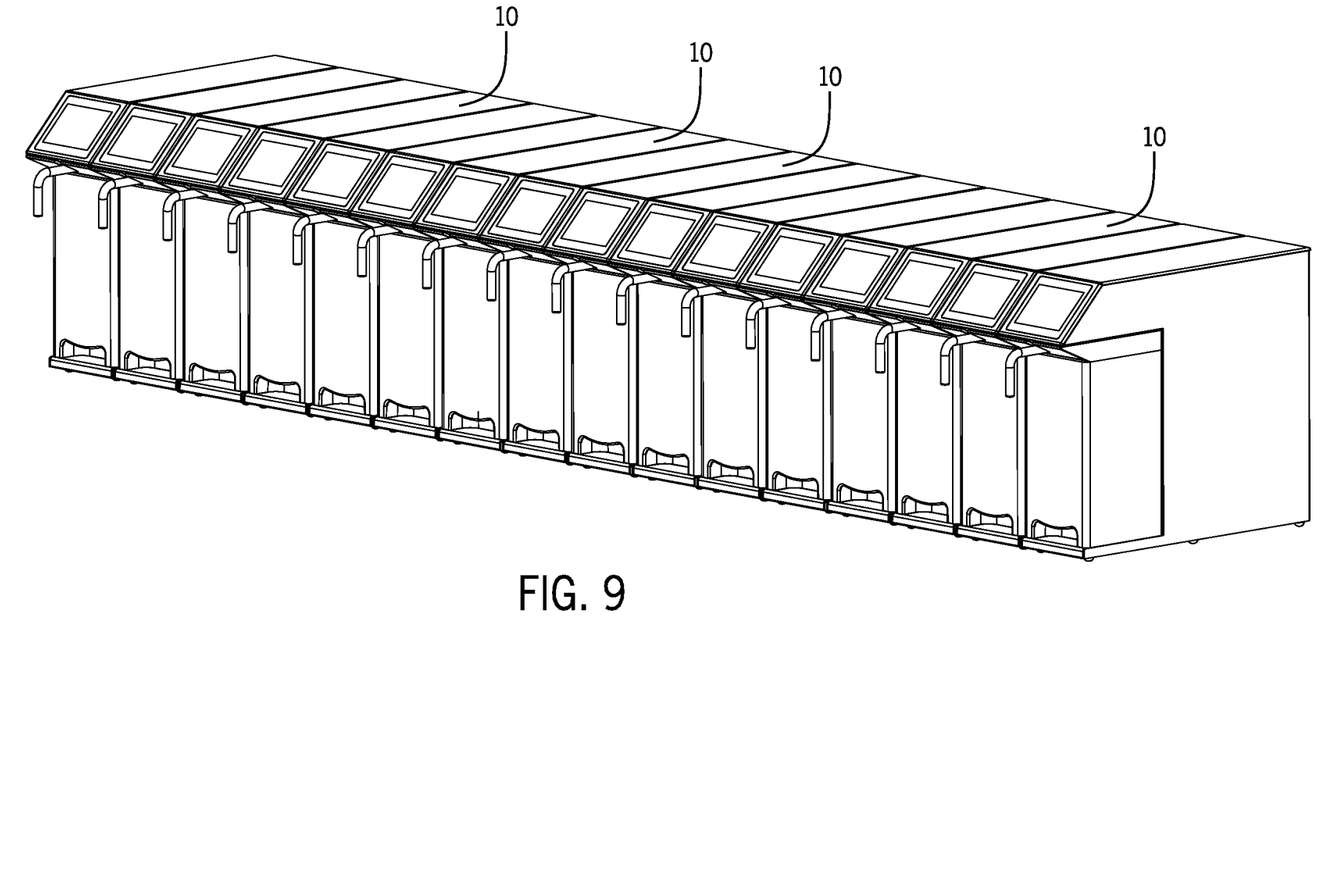
FIG. 9 is a second configuration for the arrangement of multiple food product dispensers.

FIGS. 8 and 9 illustrate alternate ways to organize multiple food product dispensers 10. In the embodiment shown in FIG. 8, there are two rows of eight food product dispensers each that are stacked on top of each other. In a restaurant location in which sixteen different toppings can be placed onto a food item, stacking the food product dispensers in this manner allows for space savings and allows a user to select and dispense the desired sauce or topping onto the food item. In the embodiment illustrated in FIGS. 8 and 9, a front indicator panel can be used to identify the type of sauce included within the food product dispenser 10.

In the embodiment shown in FIG. 9, the same sixteen food product dispensers are organized in a side-by-side relationship such that all of the same sixteen sauces are available for use and application to a food item. Additionally, it is contemplated that the food product dispensers could be stacked more than two high as shown in FIG. 8 or that less or greater numbers of food product dispensers could be utilized.

In the two embodiments shown in FIGS. 8 and 9, multiple food product dispensers can be both physically joined to each other and the power supplies can be daisy-chained together to reduce the number of plugs need for connection to the utility power supply. The power connections between the dispensers can be done in a wide variety of manners.

When the internal storage area of any one of the food product dispensers has been depleted, the user will need to refill the sauce or flowable food product into the container of the storage container assembly. To do this, the storage container assembly 24 is initially pulled away from the main housing 12. The main housing 12 includes the pair of guide rails 100 on the support panel 98 to help guide this movement. Once the storage container assembly 24 has been removed from the main housing 12, the cover member 34 is raised slightly until the engagement portion 50 is above the rim 56, as shown in FIG. 5. Once in this elevated position, the cover member 34 can either be pivoted slightly the side or pivoted slightly upward. Since the pump outlet tube 82 is offset from the center line of the container 28, it is contemplated that the cover member 34 would pivot toward that side of the container 28 to provide better access to the open interior of the container. In this position, additional sauce/condiment/topping can be added to the open storage container until the open interior is filled with the desired amount of the food product. Once refilled, the storage container assembly 24 can be returned to the operative position such as shown in FIG. 1.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A food product dispenser operable to selectively dispense a food product as desired by a user, the food product dispenser comprising:
    a main housing including an open receiving area defined by a pair of side walls and a back support wall;
    an electric drive motor located within the main housing; and
    a storage container assembly selectively movable into and out of the open receiving area of the main housing, the storage container assembly comprising:
        a container having an open interior configured to receive the food product;
        a pump operable to withdraw the food product from the open interior; and
        a dispensing tube connected to an outlet of the pump to receive the food product withdrawn by the pump;
    wherein the electric drive motor is operable to drive the pump when the storage container assembly is in the open receiving area of the main housing, and
    wherein the pump is mounted to a back wall of the container.

2. The food product dispenser of claim 1 wherein the electric drive motor is mounted to the back support wall and includes a drive shaft that extends through the back support wall and into the open receiving area.

3. The food product dispenser of claim 2 wherein the drive shaft engages the pump when the storage container assembly is moved into the open receiving area.

4. The food product dispenser of claim 1 wherein the storage container assembly further comprises a cover member received on the container, wherein the dispensing tube is supported on the cover member.

5. The food product dispenser of claim 4 wherein the cover member is pivotable relative to the container to provide access to the open interior of the container.

6. The food product dispenser of claim 1 further comprising a pump support bracket mounted to the back wall of the container, wherein the pump is received and retained by the pump support bracket.

7. The food product dispenser of claim 1 further comprising:
a control panel coupled to the main housing; and
a control unit contained within the main housing and in communication with the control panel and the electric drive motor, wherein the control unit is operable to control operation of the electric drive motor based on the control panel.

8. The food product dispenser of claim 1 wherein the pump is a rotary impeller pump.

9. A food product dispenser operable to selectively dispense a food product as desired by a user, the food product dispenser comprising:
a main housing including an open receiving area defined by a pair of side walls and a back support wall;
an electric drive motor located within the main housing;
a control panel coupled to the main housing and defining a front of the food product dispenser, the control panel configured to receive a user input;
a control unit disposed within the main housing and in communication with the control panel and the electric drive motor, the control unit configured to determine an amount of the food product to dispense based on the user input at the control panel and to control operation of the electric drive motor to dispense the determined amount of food product;
a container selectively movable into and out of the open receiving area of the main housing, the container having an open interior configured to receive the food product, and the container comprising a front wall and a rear wall opposite the front wall;
an inlet tube having a first end extending into the open interior of the container;
an outlet tube;
a pump positioned between the inlet tube and the outlet tube, wherein the pump is configured to couple to the container and is operable to withdraw the food product from the open interior through the inlet tube and discharge the food product to the outlet tube; and
a dispensing tube connected to an outlet of the pump to receive the food product withdrawn by the pump, the dispensing tube including a spout, wherein a portion of the dispensing tube is positioned entirely above the container;
wherein the electric drive motor is operable to drive the pump when the storage container is in the open receiving area of the main housing, and
wherein the pump is positioned rearward of the rear wall of the container.

10. The food product dispenser of claim 9 wherein the pump is mounted to a back wall of the container.

11. The food product dispenser of claim 10 wherein the electric drive motor is mounted to the back support wall of the main housing and includes a drive shaft that extends through the back support wall and into the open receiving area.

12. The food product dispenser of claim 11 wherein the drive shaft engages the pump when the container is moved into the open receiving area.

13. The food product dispenser of claim 9 further comprising a cover member received on the container, wherein the dispensing tube is supported on the cover member.

14. The food product dispenser of claim 13 wherein the cover member is pivotable relative to the container to provide access to the open interior of the container.

15. The food product dispenser of claim 9 further comprising a pump support bracket mounted to a back wall of the container, wherein the pump is received and retained by the pump support bracket.

16. The food product dispenser of claim 9 wherein the pump is a rotary impeller pump.

17. The food product dispenser of claim 9 wherein the electric drive motor is in operative communication with the pump when the container is within the open interior.

18. The food product dispenser of claim 9 wherein the user input includes a type of a food item to which the food product is applied, and at least one of an order size of the food item and a quantity of the food item.

19. A food product dispenser operable to selectively dispense a food product as desired by a user, the food product dispenser comprising:
a main housing including an open receiving area in a front side of the main housing, the open receiving area defined by a pair of side walls and a back support wall;
an electric drive motor disposed within the main housing;
a container configured to be received in the open receiving area, the container having an open interior configured to receive the food product;
a pump coupled to the electric drive motor and operable to withdraw the food product from the open interior;
a dispensing tube coupled to an outlet of the pump to receive the food product withdrawn from the container by the pump, the dispensing tube having a spout that extends from the front side of the main housing; and
a control unit configured to determine an amount of the food product to dispense based on a user input and to control operation of the electric drive motor to dispense the determined amount of food product, a portion of the control unit is positioned entirely above the container.

* * * * *

UNITED STATES PATENT AND TRADEMARK OFFICE
CERTIFICATE OF CORRECTION

PATENT NO. : 12,215,014 B2
APPLICATION NO. : 17/983893
DATED : February 4, 2025
INVENTOR(S) : Steven J. Ennesser et al.

Page 1 of 1

It is certified that error appears in the above-identified patent and that said Letters Patent is hereby corrected as shown below:

In the Claims

Column 9, Line 50, "storage container", should be --container--.

Signed and Sealed this
Eleventh Day of March, 2025

Coke Morgan Stewart
*Acting Director of the United States Patent and Trademark Office*